Patented June 16, 1931

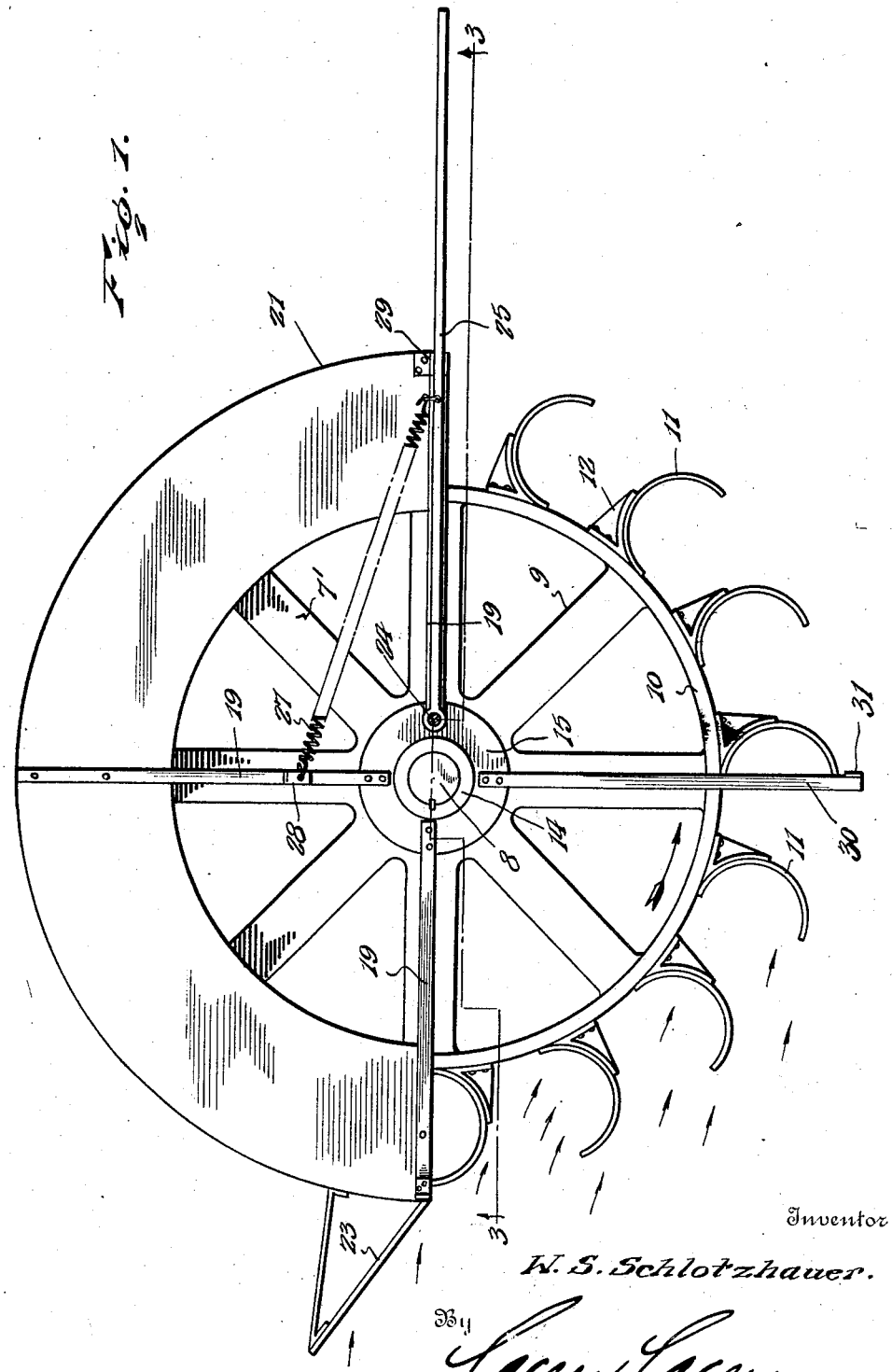

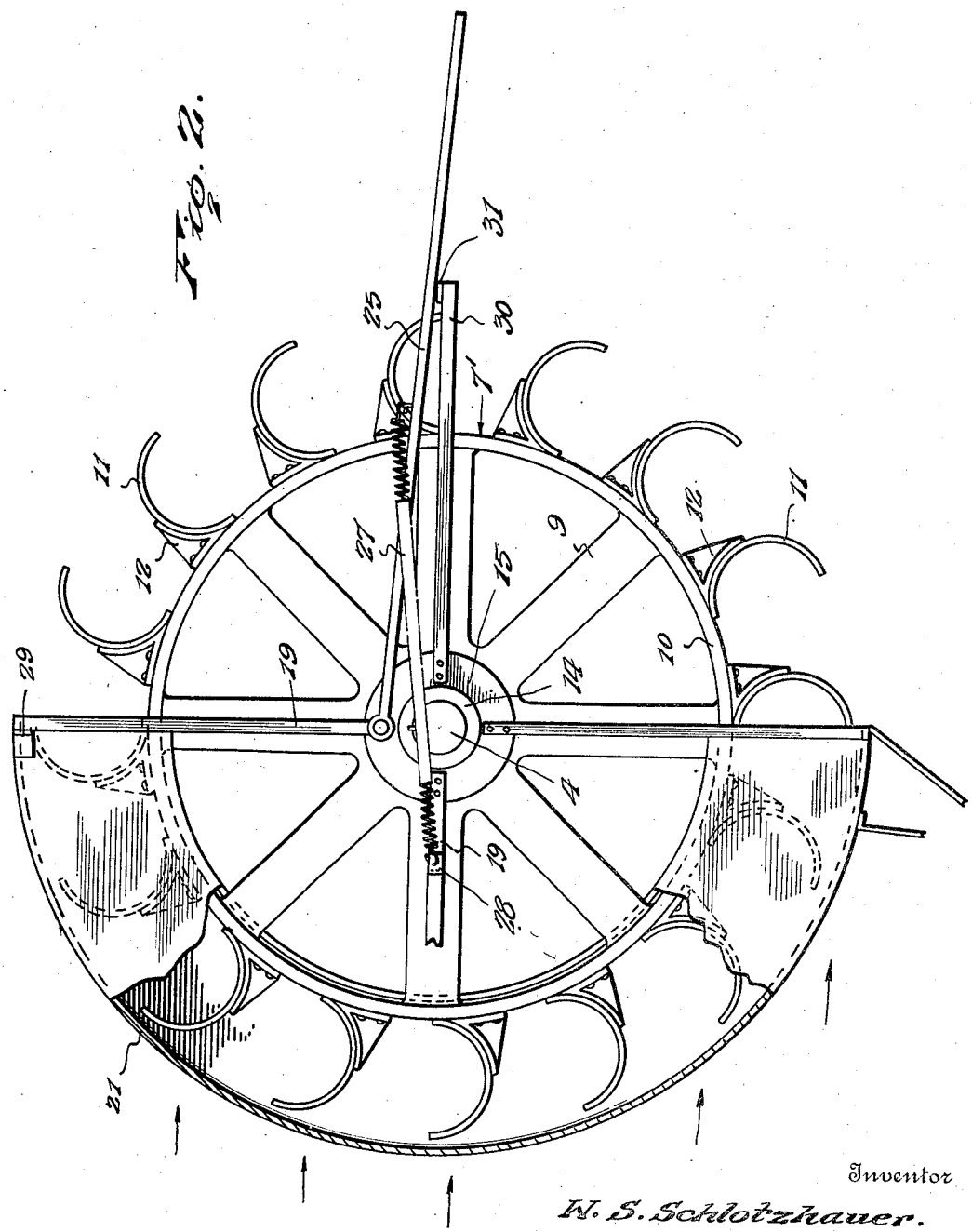

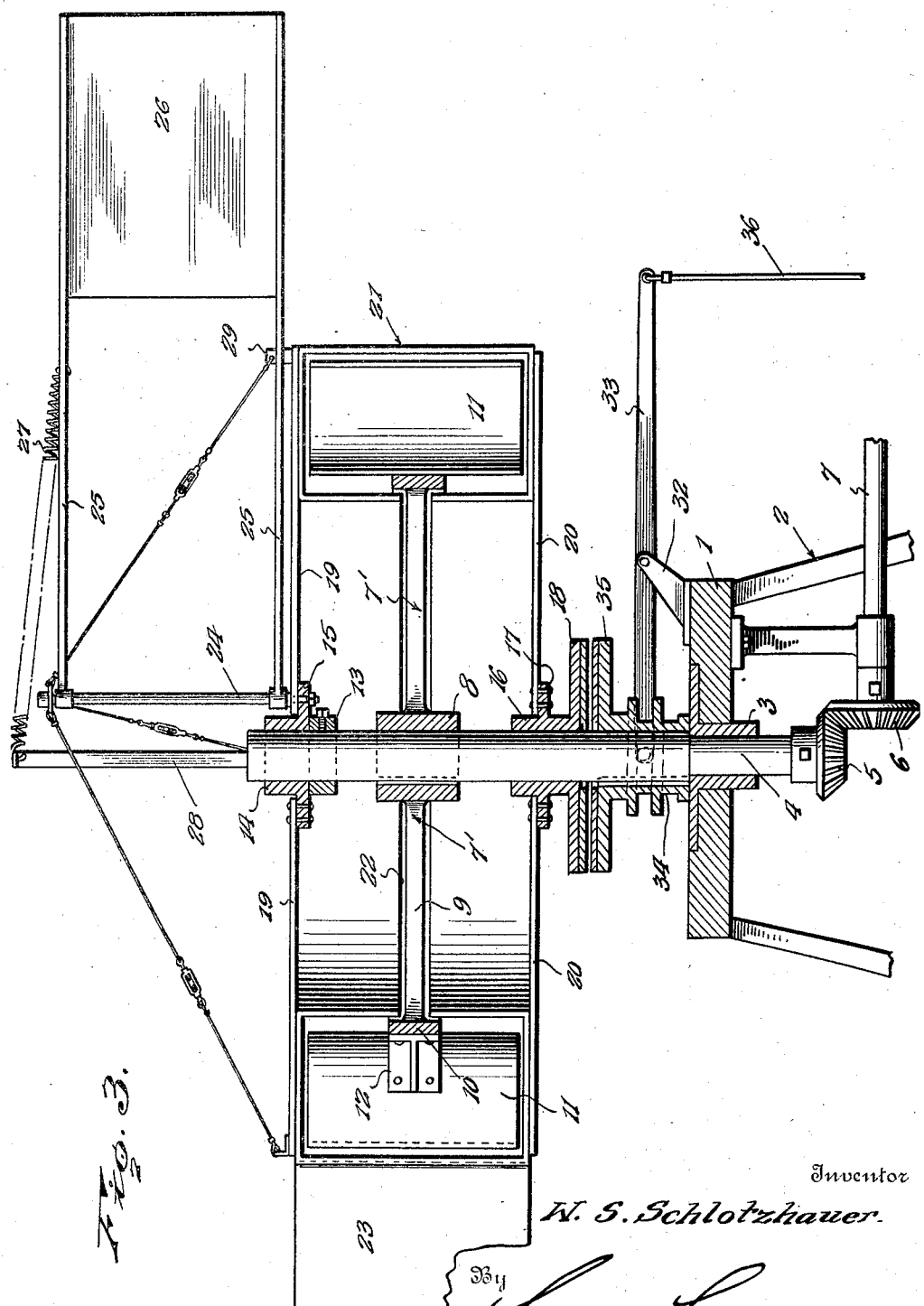

1,810,113

UNITED STATES PATENT OFFICE

WALTER S. SCHLOTZHAUER, OF DOUGLAS, ARIZONA

WIND MOTOR

Application filed April 30, 1929. Serial No. 359,388.

The present invention is directed to improvements in wind motors.

The primary object of the invention is to provide a device of this character so constructed that the propelling blades can be shielded against the action of the wind when desired.

Another object of the invention is to provide a wind motor including an arcuate shield through which a part of the propelling blades successively travel, while the remaining blades are exposed to the action of the wind.

Another object of the invention is to provide a device of this character wherein the shield revolves about the main shaft so that the wind vane will swing the shield to a position to prevent the wind from acting upon the propeller blades, thereby stopping the wind wheel.

With these and other objects in view, this invention resides in the novel features of construction, formation, combination and arrangement of parts to be hereinafter more fully described, claimed and illustrated in the accompanying drawings, in which:

Figure 1 is a plan view showing the shield in position when the propeller blades are being acted upon by the wind.

Figure 2 is a top plan view, partly in section, showing the shield shifted to prevent action upon the blades by the wind.

Figure 3 is a sectional view on the line 3—3 of Figure 1.

Referring to the drawings, 1 designates the platform of a conventional form of tower 2, said platform having a bearing 3 therein in which is journaled a main shaft 4, the lower end of which carries a beveled gear 5 meshing with a similar gear 6 fixed to the shaft 7, and from which the power is transmitted. The wind wheel 7' comprises a hub 8 which is keyed upon the shaft 4 and from which the spokes 9 extend, said spokes having fixed to their outer ends the rim 10. A plurality of propeller blades 11 are secured to the rim by brackets 12, said blades being semi-circular in cross section so that the cavities will be successively presented to the wind for deriving maximum power.

A collar 13 is fixed to the shaft 4 near the upper end thereof and limits the downward movement of the sleeve 14 which is engaged upon the shaft and is capable of rotating on said collar. This sleeve is provided with an annular flange 15. A sleeve 16 is rotatably engaged with the shaft 4 below the hub 8 and is provided with an annular flange 17 and a clutch disc 18, the purpose of which will be later explained.

The flanges 15 and 17 have fixed thereto the inner ends of the upper and lower bars 19 and 20 respectively, which are preferably arranged in groups of three. These bars serve to support the sheet metal shield 21, said shield being of arcuate formation and having longitudinal slots 22 formed in its inner wall to permit the spoke 9 to travel during rotation of the wind wheel 7. It will be observed that when one-half of the blades 11 are traveling through the shield, the remaining blades will be positioned for action thereupon by the wind, as clearly shown in Figures 1 and 3 of the drawings. A deflecting plate 23 is secured to one end of the shield 21, the purpose of which will be obvious.

Having its upper end fixed to the flange 15, is a rod 24 to which are pivotally connected the inner ends of the vertically spaced bars 25 which support the wind vane 26 which serves to hold the wheel in the wind, as customary. A coil spring 27 is provided and has its outer end secured to the upper bar 25 while the inner end thereof is secured to a post 28 fixed to one of the bars 19. This spring will hold the lower bar 25 against the stop 29 carried by a companion bar 19 so that the vane 26 will hold the blades 11 in the wind. An arm 30 has its inner end fixed to the flange 15 and has a stop 31 upon its outer end, the purpose of which will appear later.

A bracket 32 is carried by the platform 1 and has pivotally connected thereto a lever 33 which is connected with the collar 34 slidably keyed on the shaft 4, the said collar having a clutch disc 35 carried thereby to coact with the disc 18.

A cord 36 is secured to the outer end of the lever 33 and may be tied at any convenient point to hold the discs 18 and 35 engaged, When the wind wheel is operating, the shield 21 will be in the position shown in Figure 1, at which time the spring 27 will hold the lower bar 25 against the stop 29 in order that the vane 26 will hold the propeller blades 11 properly positioned for action upon by the wind.

When it is desired to stop rotation of the wheel, the shield is swung into the wind and assumes the position shown in Figure 2, at which time the clutch discs 18 and 34 are interlocked. The wind acting upon the vane 26 will swing the same from engagement with the stop 29 and into engagement with the stop 31, the spring 27 serving to hold the lower bar 25 yieldably engaged with the stop 31. In this manner, the vane 26 will serve to hold the shield in the wind so that the wind will not act upon the vanes 11, thus preventing rotation of the wind wheel 7'. As soon as the clutch discs are disengaged the vane 26 will act to swing the shield to a position to permit the wind to act upon the exposed blades 11. The shield 21 is formed from suitable sheet metal and is of casing-like form in order that when the blades 11 are positioned therein they will be fully protected from the action of the wind.

From the forgeoing, it is thought that the construction, operation and many advantages of the herein described invention will be apparent to those skilled in the art, without further description, and it will be understood that various changes in the size, shape, material, proportion and minor details of construction may be resorted to without departing from the spirit or sacrificing any of the advantages of the invention.

What is claimed is:

1. A wind motor including a vertical shaft, a horizontal wind wheel keyed to the shaft, a shield loose upon the shaft and enclosing a portion of the wind wheel, a vane mounted upon the shield and adapted to be acted upon by the wind to position the shield to hold the wind wheel in or out of the wind, and a manually controlled clutch having one member connected with the shield to rotate therewith and having the other member engaged with the shaft to turn therewith and movable toward and away from the companion member to effect clutched engagement of the wind wheel and shield.

2. A wind motor including a vertical shaft, a horizontal wind wheel keyed to the shaft, a shield loose upon the shaft and inclosing a portion of the wind wheel, a vane pivotally mounted upon the shield and adapted to be acted upon by the wind to position the shield to hold the wind wheel in or out of the wind, stops on the shield to limit the pivotal movement of the vane, a spring between the vane and shield to normally position the shield to hold the wheel in the wind, and a manually operable clutch having one member connected with the shield and the other member rotatable with the wheel and movable into and out of engagement with the companion member.

3. A wind motor including a vertical shaft, spokes radiating from the shaft, a rim connecting the outer ends of the spokes, blades mounted upon the rim, a hollow shield loosely mounted upon the shaft and enclosing approximately one-half of the blades to prevent action of the wind thereon, a vane pivotally mounted upon the shield, stops on the shield to limit the pivotal movement of the vane, a spring between the shield and vane to hold the motor in the wind, a coacting clutch member rotatable with the shaft and movable thereon, and a manually operable lever in engagement with the movable clutch member.

In testimony whereof I affix my signature.

WALTER S. SCHLOTZHAUER. [L. S.]